Aug. 5, 1958     V. L. LINDBERG ET AL     2,845,838
APPARATUS FOR CONTROLLING THICKNESS OF DEPOSITED
LAYERS IN PRODUCING INTERFERENCE FILTERS
Filed Nov. 19, 1954

V. L. LINDBERG
M. J. IRLAND
INVENTORS

BY E. C. McRae
J. R. Faulkner
D. H. Oster

ATTORNEYS

2,845,838

APPARATUS FOR CONTROLLING THICKNESS OF DEPOSITED LAYERS IN PRODUCING INTERFERENCE FILTERS

Victor L. Lindberg, Northville, and Max J. Irland, Dearborn, Mich., assignors to Ford Motor Company, Dearborn, Mich., a corporation of Delaware Application November 19, 1954, Serial No. 469,937

4 Claims. (Cl. 88—14)

A need has recently arisen in the field of optics for a medium which will be highly transparent to one particular narrow band of wave lengths of light and which will almost completely reflect or absorb light having other wavelengths. One of the most successful devices for attaining this end stems originally from the "Fabry-Perot" interferometer reported in a publication by S. Tolansky entitled "Multiple Beam Interferometry of Surfaces and Films"—1948, chapter 2. This light filter consists basically of reflecting films composed of an odd number of quarter wave dielectric layers of alternately high and low indices of refraction laid down upon a glass supporting layer. The quarter wave length of course, refers to the wave length of the light to be transmitted and not of that to be reflected.

In the production of these filters it has been the practice to evaporate upon a clean glass plate under a vacuum alternate layers of zinc sulphide and cryolite. It is necessary that a spacer layer of cryolite be located intermediate the glass surface and the final dielectric film. To increase the selectivity of such a structure it is necessary to deposit a substantial number of dielectric layers. As the number of layers increases the difficulty of fabrication increases geometrically due to the difficulty in ascertaining when the precise thickness of each deposit has been attained.

Figure 1:
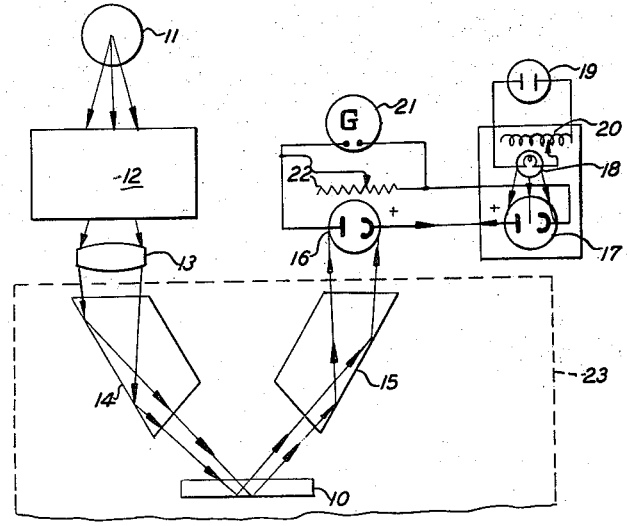

The instant invention has been perfected to enable any reasonable number of layers of dielectric to be deposited with each layer accurately approximating the requisite thickness of one quarter wave length. This invention is best described in conjunction with the drawings in which Figure 1 is a diagrammatic showing of the apparatus employed for this purpose and Figure 2 is a graph in which the reflectivity of the filter is drawn against the number of layers of dielectric.

The deposition of the alternate layers of zinc sulphide and cryolite on the base glass is accomplished by heating the appropriate dielectric in a molybdenum boat in a bell jar which has been evacuated and permitting the dielectric vapors so produced to condense upon the filter. It has been found impractical to monitor the thickness of the deposit by any means other than a direct measurement of the reflectivity of the deposit being produced. Even this direct measurement technique becomes increasingly feeble and finally fails utterly as the number of layers of dielectric is increased.

Figure 2:
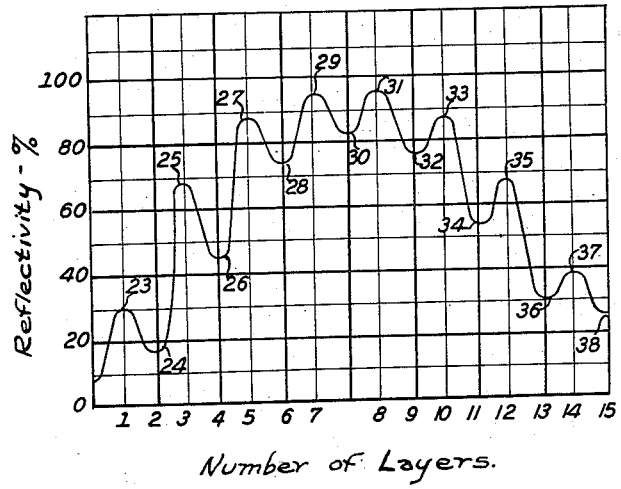

The reason for this may readily be seen from an inspection of Figure 2 of the drawing. In Figure 2 the abscissa represents the number of layers of dielectric and the ordinate the percentage reflectivity of the filter structure to light of the desired wave length incident at the angle to be employed in actual use of the filter. It will be noted that in this graph, the distance between the end of the 7th and end of the 8th layer is greater than that of any other layer. This represents the intermediate cryolite spacing layer.

Of the layers laid down intermediate the glass and the spacer layer, those layers for which the slope of the curve is positive are zinc sulphide layers and those for which the slope is negative are cryolite layers. The central spacing layer is of course cryolite, and for the layers laid down upon the central spacer layer those for which the curve has a negative slope are zinc sulphide and for those for which the curve has a positive slope are cryolite. The maximae demonstrated by this curve have been assigned odd numbers from 23 through 37 and the minimae have been assigned even numbers from 24 through 38.

Prior to this invention, it has been the practice to directly measure the reflectivity of the first layer deposited and to interrupt the depositing phenomenon when the slope of the curve became zero or otherwise stated when the first differential of the equation representing this curve approaches zero from a positive direction. In the structure represented by Figure 2 the original layer would be zinc sulphide and is represented as terminating at maximum 23. Cryolite is then deposited until a minimum 24 is attained, then zinc sulphide to the maximum 25 and cryolite to the minimum 26. This is continued in the same fashion until the highest minimum represented as 30 has been reached which is a theoretical mid-thickness of the cryolite spacing layer. The deposition of cryolite is continued until maximum 31 is attained and the structure represented by the descending portion of the curve is then produced by a continuation of the process.

For the first two or three layers, direct reflectivity measurements are sufficiently accurate for properly terminating the deposition of each layer of dielectric. However, as the reflectivity increases as more layers are added, the change in reflectivity for each layer correspondingly decreases and the change which must be observed to enable the layer to be properly terminated becomes vanishingly small. For example, the distance between minimum 28 and maximum 29 is only about 8 percent reflectivity and the termination of the operation must be judged by a small change in this initially small value. This small change accordingly bulks so small as compared to experimental error as to be meaningless.

To avoid this difficulty, the apparatus depicted in Figure 1 has been devised, set up and used. In this apparatus, the filter 10 on which the layers to be deposited is contained within bell jar 23. Filter 10 is illuminated from light source 11 which is passed through a grating monochromator 12 and through condensing lens 13 and prism 14. The grating monochromator 12 is selected to produce a light of a wave length at which the finished filter will operate and the light from prism 14 falls upon filter 10 at the same angle which is contemplated for service. Prism 15 is oriented to direct light reflected from filter 10 upon light responsive cell 16. Light responsive cell 16 is connected in series with an identical light responsive cell 17 with opposed polarity. Light responsive cell 17 is activated by light source 18 which is energized from any suitable power source 19 controlled by rheostat or transformer 20. It is to be noted that the light falling upon light responsive cell 17 need not have any specific wave length but can be ordinary white light. The net output of light responsive cells 16 and 17 is measured by a sensitive galvanometer 21, the sensitivity of which is controlled by variable resistor 22.

With the glass base for filter 10 in place under bell-jar 23, the system is evacuated and light 11 is energized. Light 19 is now energized and control 20 is adjusted to yield a zero deflection of galvanometer 21. Variable resistor 22 which shunts galvanometer 21 is now adjusted on the basis of calculation or experience so that approximately full scale deflection will be obtained when the first layer has been deposited to a thickness of one quarter wave length. Evaporation and deposition is then carried out until the desired reading of galvanometer 21 is obtained. This completes the production of the first layer.

Since the termination of the second layer is marked by a minimum rather than a maximum, it is necessary to alter the electrical procedure from that employed for the first layer. The galvanometer is now caused to read 100% of full scale by proper adjustment of control 20 and shunt variable resistor 22 is set so that galvanometer 21 will have a reading approximating zero when the proper thickness of layer has been deposited. In this manner almost a full scale deflection of the galvanometer 21 is available for checking the thickness of the deposit. This procedure is repeated throughout the entire deposition.

As a consideration of Figure 2 will show, this procedure has been highly successful in producing such filters. Figure 2 shows a filter having a reflectivity of about 25% and hence a transmission of about 75% neglecting slight absorption. This filter exhibited the excellent value of 65 angstroms for the half band width.

It is preferred that photo responsive cells 16 and 17 be identical photo voltaic cells. However this is by no means necessary to the practice of the invention. Any suitable light responsive electrical cell may be substituted for these cells without departing from the spirit of the invention. Similarly, the voltage which is opposed to that produced by light responsive cell 16 need not be produced by another light responsive cell, but may originate in any suitably controllable and stable voltage source. Such equivalents will readily suggest themselves to those skilled in the art.

We claim as our invention:

1. An apparatus for controlling the thickness of deposited layers during the production of interference filters comprising a source of substantially monochromatic light, means for impinging this monochromatic light upon a glass base during deposition of the dielectric layers, a first light sensitive cell, means for causing the light originating in the monochromatic source and reflected from the filter surface to impinge upon said first light sensitive cell, a second light sensitive cell connected to said first light sensitive cell so that the outputs are electrically opposed, a galvanometer connected to read a function of the algebraic sum of the outputs of the two light sensitive cells, a variable resistance shunting said galvanometer, a light illuminating said second light sensitive cell and means for adjusting the output of said light, whereby the galvanometer indicates when the deposition of each dielectric layer should be terminated.

2. An apparatus for controlling the thickness of deposited layers during the production of interference filters comprising a source of substantially monochromatic light, means for impinging this monochromatic light upon a glass base during deposition of the dielectric layers, a first photo-voltaic cell, means for causing the light originating in the monochromatic source and reflected from the filter surface to impinge upon said first photo-voltaic cell, a second photo-voltaic cell connected to said first photo-voltaic cell so that the voltages produced are electrically opposed, a galvanometer connected to read a function of the algebraic sum of the output voltages of the two photo-voltaic cells, a variable resistance shunting said galvanometer, a light illuminating said second photo-voltaic cell and means for adjusting the output of said light, whereby the galvanometer indicates when the deposition of each dielectric layer should be terminated.

3. An apparatus for controlling the thickness of deposited layers during the production of interference filters comprising a source of substantially monochromatic light, means for impinging this monochromatic light upon a glass base during deposition of the dielectric layers, a light sensitive cell, means for causing the light originating in the monochromatic source and reflected from the filter surface to impinge upon said light sensitive cell, an adjustable and stable voltage source connected to said light sensitive cell so that the outputs are electrically opposed, a galvanometer connected to read a function of the algebraic sum of the outputs of the voltage source and the light sensitive cell, and a variable resistance shunting said galvanometer, whereby the galvanometer indicates when the deposition of each dielectric layer should be terminated.

4. An apparatus for controlling the thickness of deposited layers during the production of interference filters comprising a source of substantially monochromatic light, means for impinging this monochromatic light upon a glass base during deposition of the dielectric layers, a photo-voltaic cell, means for causing the light originating in the monochromatic source and reflected from the filter surface to impinge upon said photo-voltaic cell, an adjustable and stable voltage source connected to said photo-voltaic cell so that the outputs are electrically opposed, a galvanometer connected to read a function of the algebraic sum of the outputs of the voltage source and the photo-voltaic cell, and a variable resistance shunting said galvanometer, whereby the galvanometer indicates when the deposition of each dielectric layer should be terminated.

References Cited in the file of this patent

UNITED STATES PATENTS

| Number | Name | Date |
| --- | --- | --- |
| 1,834,905 | Sheldon | Dec. 1, 1931 |
| 2,032,010 | Goodwin | Feb. 25, 1936 |
| 2,233,879 | Tolman | Mar. 4, 1941 |
| 2,338,234 | Dimmick | Jan. 4, 1944 |
| 2,472,605 | McRae et al. | June 7, 1949 |
| 2,584,583 | Hillery | Feb. 5, 1952 |
| 2,771,055 | Kelly et al. | Nov. 20, 1956 |